Figure 1:
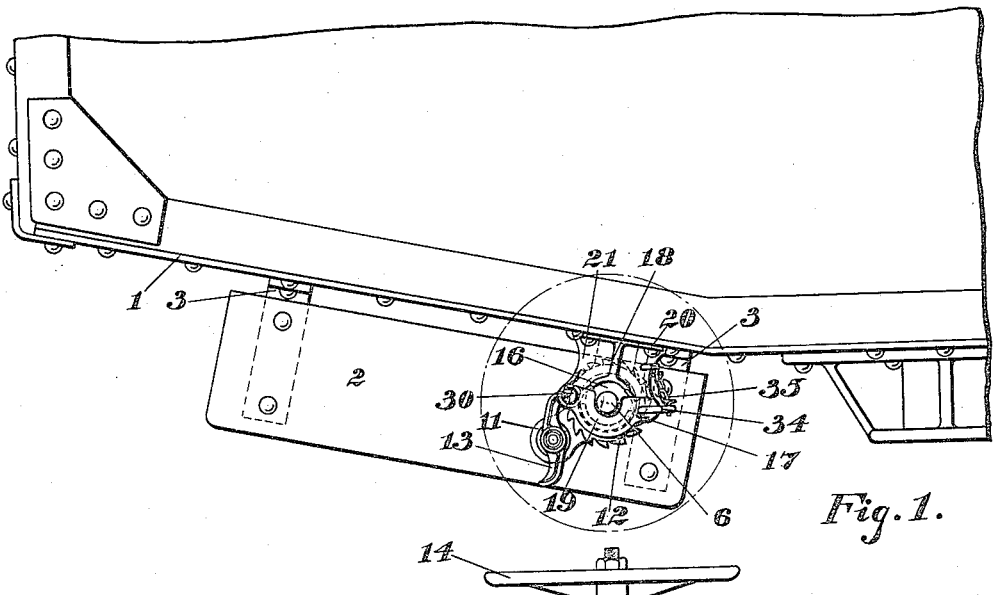

J. P. ANDERSON.
BRAKE MAST.
APPLICATION FILED APR. 24, 1914.

1,159,883.

Patented Nov. 9, 1915.
2 SHEETS—SHEET 1.

Inventor
John P. Anderson.

By Frank E. Miller,
Attorney

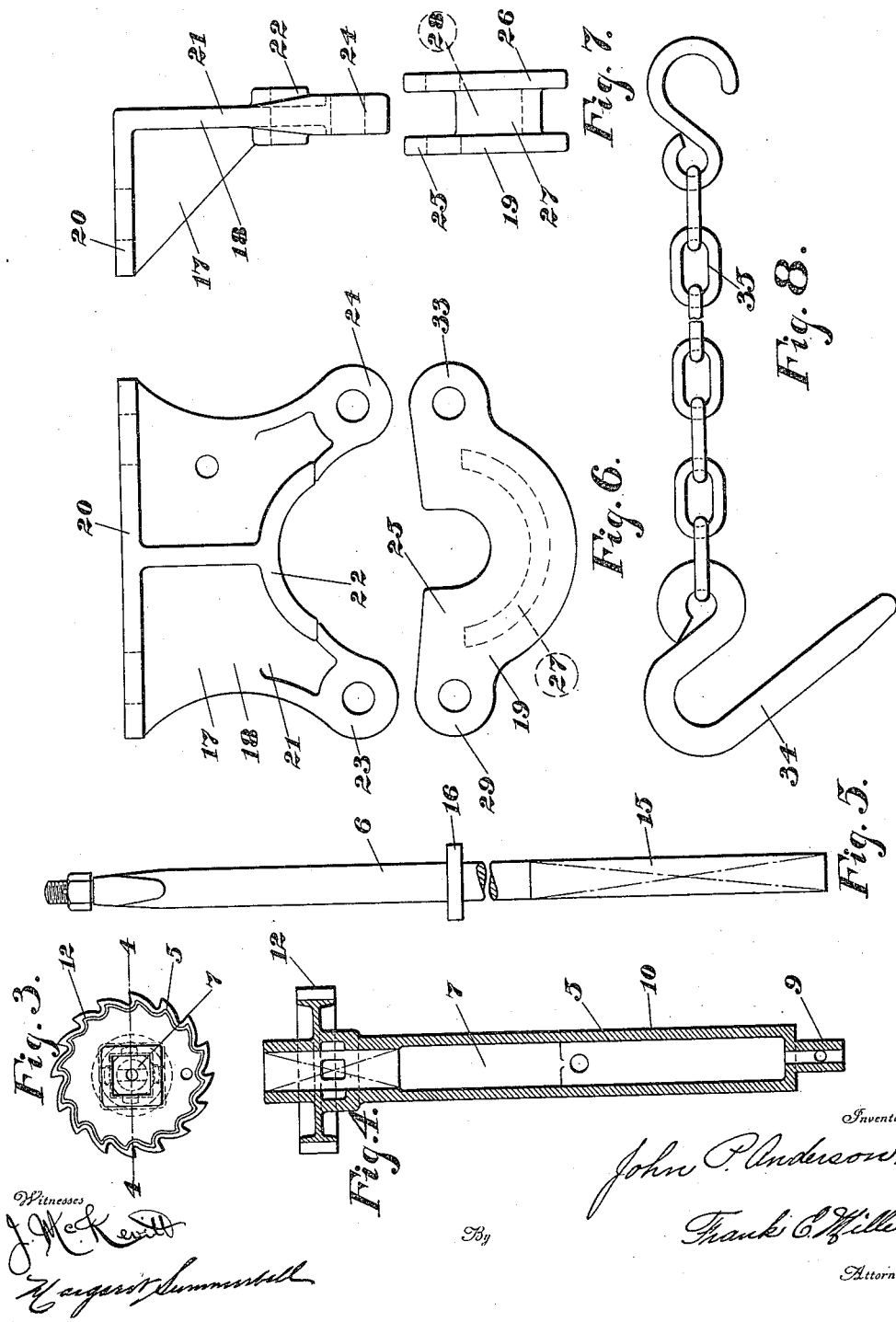

UNITED STATES PATENT OFFICE.

JOHN P. ANDERSON, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

BRAKE-MAST.

1,159,883.  Specification of Letters Patent.  Patented Nov. 9, 1915.

Application filed April 24, 1914. Serial No. 834,128.

*To all whom it may concern:*

Be it known that I, JOHN P. ANDERSON, citizen of the United States, residing at No. 704 North Rebecca street, Pittsburgh, in the county of Allegheny and State of Pennsylvania, have invented certain new and useful Improvements in Brake-Masts, of which the following is a full, clear, and exact description of the same.

It has been the practice heretofore in building cars, especially of the gondola and hopper type, to apply vertical brake masts which are rigidly mounted in a vertical direction, the top portions of such mast extending above the top edges of the walls of the car. While loading these cars with coal, billets or other heavy material, the portions of the brake masts extending above the walls of the cars are often bent so badly by contact with the loading machinery or material that the mast as a whole is rendered inoperative.

An object of the invention is to provide a brake mast, which when applied to a car may be lowered from its normal operable position, to a position where it will still be operable and also less liable to damage when the car is being loaded or unloaded.

Another object of the invention is to provide novel means for holding a brake mast to a car in its preferred operable position.

These and other objects will appear in the following specification and in the appended claims.

Referring now to the drawings in which like reference characters refer to like parts, and in which—

Figure 2:
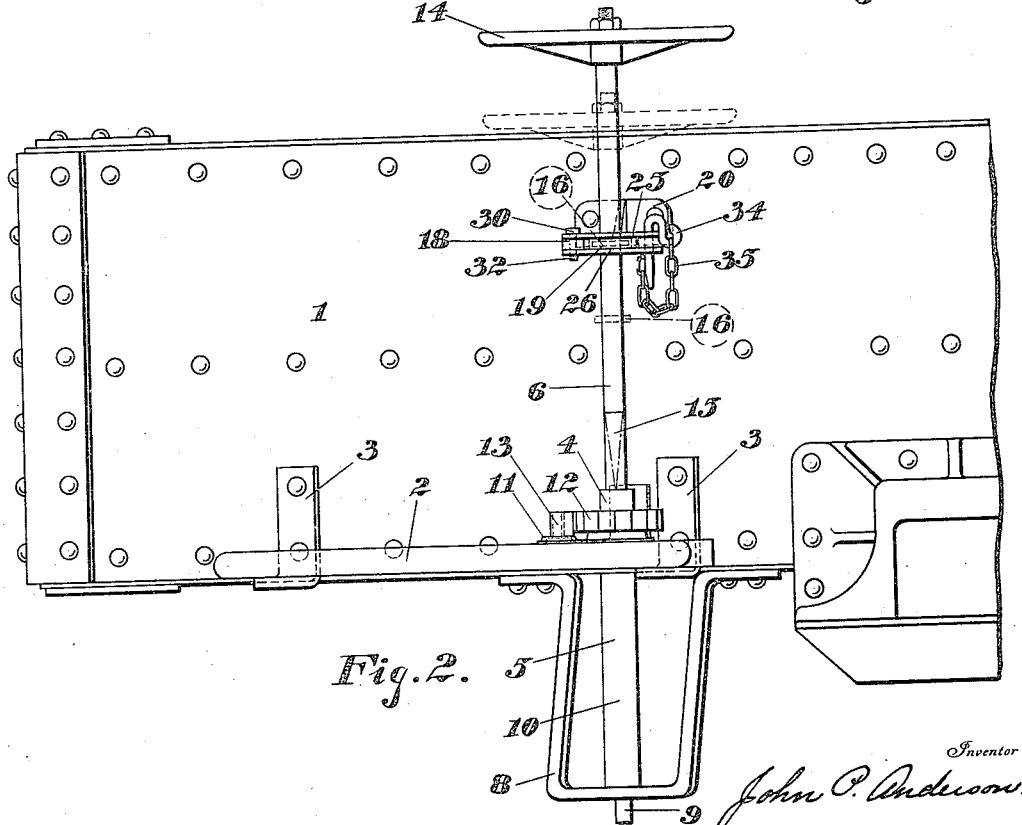

Figure 1 is a plan view of a portion of a car embodying the invention; Fig. 2 is an end elevational view of the same; Fig. 3 is an enlarged detail plan view of the operated portion of the brake mast; Fig. 4 is a vertical sectional view of the same taken on the line 4—4 of Fig. 3; Fig. 5 is an enlarged detail view of the operating portion of the brake mast; Figs. 6 and 7 are detail plan and side views respectively of the combined bearing and clamp member, the parts being shown separated, and Fig. 8 is an enlarged view of a locking and safety chain.

Referring now in detail to the drawings, 1 indicates the end wall of a car, and 2 a brake step which is attached to the brackets 3, 3 that are secured to the end wall.

4 indicates a brake mast which comprises an operated or chain winding part 5 and an operating part 6. The part 5 is made preferably of cast metal and is provided with an opening 7 that preferably extends the full length thereof. This opening 7 at its upper end is preferably square and is adapted to receive a portion of the operating part 6 hereinafter more fully described. The bottom portion of this part 5 is seated on and supported by a bracket 8 which may be secured to any suitable member of the car. To keep the part 5 in its operative position, the contracted portion 9 is passed through a perforation in the bracket 8.

10 indicates the chain winding portion of the part 5. The upper portion of the part 5 is journaled in a member 11 which is preferably secured to the brake step 2. Above the brake step 2 this upper portion of the part 5 is provided with a ratchet wheel 12, with which a pawl 13, pivotally mounted on the step 2, is adapted to engage. The ratchet wheel 12 is preferably integral with the part 5, but if desired it may be made separate and connected thereto by a key or other suitable means.

The operating part 6 of the brake mast is provided at one end with the ordinary hand wheel 14, and at the other end is provided with a portion 15 which is preferably square in form and is adapted to fit loosely in the square portion of the opening 7 in the part 5. Intermediate the hand wheel 14 and the portion 15, the operating part 6 is provided with a collar 16 which may be secured thereto by any suitable means. It will be seen that this collar may be made integral with the part 6.

17 indicates the combined bracket and clamp member which preferably comprises a bracket part 18 and a clamp part 19. The bracket part 18 is preferably of angular form having a portion 20 which is adapted to be secured to the wall 1 of the car, and a portion 21 which extends outwardly from the portion 20. This portion 21 is provided with a bearing portion 22 and with perforated lugs 23 and 24. The clamp part 19 comprises an upper portion 25 and a lower portion 26, which portions are spaced apart and connected together by a bearing portion 27, thus forming a recess or pocket 28. The ends 29 of the portions 25 and 26 of the part 19 fit loosely over the lug 23 of the part 18, and are adapted to be pivotally connected thereto by a pin 30 which pin may be held against loss by the head 31 and the cotter pin 32. The ends 33 of these portions 25 and 26 are adapted to fit loosely over the lug 24 of the part 19 and are provided with perforations which, when the part 19 is in its closed position, are adapted to register with the perforation in the lug 24. To hold the part 19 in closed position, a member 34 is provided which is passed through the perforations in both of the parts 18 and 19. To prevent the loss of this member 34, a flexible member 35 is provided, one end of which is fastened to the member 34 and the other end of which is preferably fastened to the part 18.

When the operating part 6 of the brake mast is in its preferred vertical position as shown in full lines in Fig. 2 of the drawings, the collar 16 on the part 6 is received within the recess or pocket 28 in the part 19 of the combined bracket and clamp member 17, and is held against vertical movement by the portions 25 and 26 of such member 17. When the parts 25 and 26 of the member 17 are in engagement with the collar 16 it will be seen that the portion 27 of the part 19 and the portion 22 of the part 18 of such member 17, form a bearing for the collar 16, which bearing is adapted to steady the part 6 of the brake mast.

When it is desired to lower the part 6 of the brake mast from its preferred vertical position, the member 34 is removed from the parts 18 and 19 of the member 17, and the part 19 is then swung outwardly on its pivot until the portion 26 of such member is out of engagement with the collar 16 on the part 6 of the brake mast, at which time said part 6 drops to its lower operable position, as shown in dotted lines in Fig. 2 of the drawings.

It will be seen that changes may be made in the detail and arrangement of the parts without departing from the spirit and scope of the invention.

Having thus described the invention, what I claim as new and desire to secure by Letters Patent is:

1. The combination with a car, of a brake mast comprising a plurality of parts, one of said parts being movable relative to the other of said parts, and means on said car adapted to engage said movable part and hold it in its preferred vertical position, said means forming a bearing for said movable part.

2. The combination with a car, of a car wall, a brake mast comprising an operated part and an operating part, said operating part being slidably connected with said operated part, and means on said wall adapted to engage said operating part and hold it in its preferred vertical position, said means forming a bearing for said operating part.

3. The combination with a car wall, of a vertically movable brake mast part, and a combined bracket and clamp member attached to said wall adapted to support said movable part.

4. The combination with a car wall, of a two part brake mast, one of said parts being movable in a vertical direction, and a combined bracket and clamp member secured to said wall adapted to support said movable part.

5. The combination with a car wall, of a combined bracket and clamp member attached to said wall, a brake mast comprising an operated part and a vertically movable operating part, a collar on said operating part, said combined bracket and clamp member being adapted to engage said collar and support said operating part.

6. The combination with a car wall, of a brake mast adapted to be raised or lowered in a vertical direction and clamping means attached to said wall adapted to hold and support said mast in its raised position.

7. The combination with a car wall, of a vertically movable brake mast, a collar on said mast, and a combined bracket and clamp member attached to said wall and adapted to engage said collar.

8. The combination with a car wall, of a brake mast comprising an operated part and a vertically movable operating part, said operating part being slidably connected with said operated part, a bracket secured to said wall, and a clamp member secured to said bracket adapted to engage said operating part and hold it in preferred vertical position.

9. The combination with a car wall, of a brake mast adapted to be raised or lowered, a bracket secured to said wall and a clamp pivotally connected with said bracket adapted to swing into engagement with the mast to support it in raised position.

10. The combination with a car wall, of a brake mast adapted to be raised or lowered in a vertical direction, a bracket secured to said wall, and means pivotally mounted on said bracket adapted to engage said mast and hold it in raised position.

11. The combination with a car wall, of a brake mast, a collar on said brake mast, a bracket secured to said wall, a clamp pivotally connected with said bracket, said clamp having a recess or pocket for the reception of said collar.

12. The combination with a car wall, of a brake mast adapted to be raised or lowered in a vertical direction to an operable position, a bracket secured to said wall and a clamp pivotally mounted on said bracket adapted to hold said brake mast in its raised operable position.

13. The combination with a car wall, of a brake mast, a bracket secured to said wall, and a clamp pivotally connected with said bracket, said bracket and clamp being adapted to receive and form a bearing for said brake mast and permit the rotation of the mast therein.

14. The combination with a car, of a bracket connected therewith, a clamp pivotally mounted on said bracket adapted to support a vertically movable brake mast part and means for holding said clamp in supporting position.

15. The combination with a car, of a vertically movable brake mast part, a bracket secured to said car, a clamp pivotally connected with said bracket member adapted to engage and support said brake mast and means for holding said clamp in its supporting position.

16. The combination with a car, of a brake mast comprising a plurality of parts, one of said parts being movable relative to the other of said parts, said movable part having a collar, and means on said car adapted to engage said collar and hold said movable part in preferred vertical position.

17. The combination with a car, of a brake mast, a bracket secured to said car, and a clamp pivotally connected with said bracket, said clamp having a recess or pocket for the reception of a part of said mast.

In testimony whereof I affix my signature in presence of two witnesses.

JOHN P. ANDERSON.

Witnesses:
MARGARET SUMMERBELL,
JAMES L. McKEVITT.